United States Patent Office 2,921,698
Patented Jan. 19, 1960

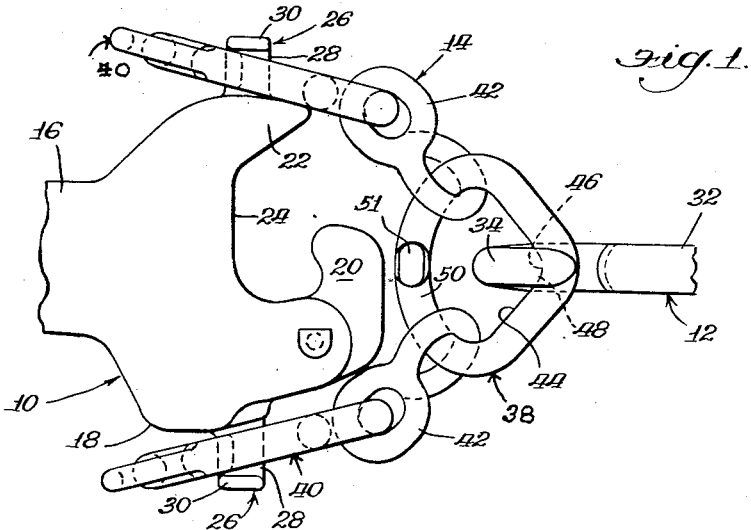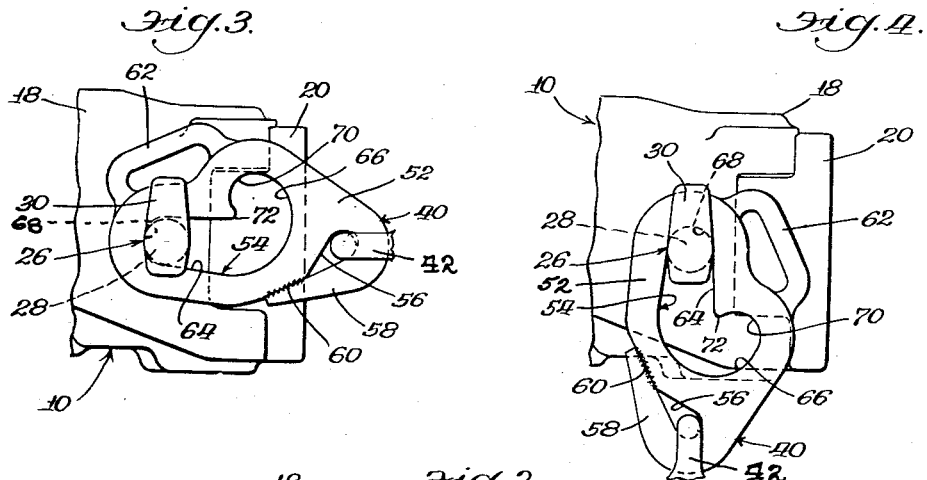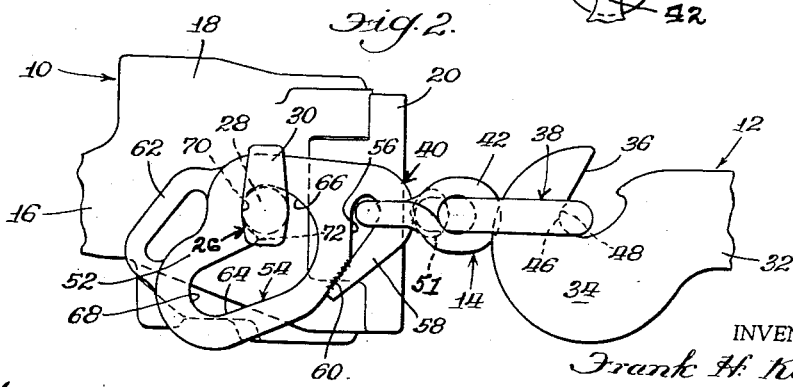

2,921,698

TRANSITIONAL COUPLING ARRANGEMENT

Frank H. Kayler, Alliance, Ohio, assignor to American Steel Foundries, Chicago, Ill., a corporation of New Jersey Application June 16, 1958, Serial No. 742,293

1 Claim. (Cl. 213—112)

This invention relates to couplers and more particularly to a transitional coupling arrangement for railway vehicles.

The invention comprehends a coupling arrangement adapted to interconnect railway vehicles equipped with different types of coupling mechanisms.

Although the recognized superiority of automatic couplers over manual couplers of the so-called screw or hook type has resulted in their being accepted in the United States as standard equipment for railway rolling stock, their higher cost has greatly retarded their acceptance as standard equipment in many foreign countries.

In most of these countries the conversion from manual to automatic coupling equipment for railway rolling stock is proceeding gradually. Only new railway vehicles are being provided with automatic couplers, and it will be several years before the majority of the older vehicles, already equipped with manual couplers, will have to be replaced.

Therefore, during this period of transition from one method of coupling to another, there is a great necessity for providing means for coupling new cars having automatic couplers to other new cars having automatic couplers as well as to older cars having non-automatic couplers.

In any transitional coupling arrangement of this type, one problem that merits serious consideration is that of providing some means to take up excess slack in the connection between the connected couplers which is not taken up by the buffers commonly carried by foreign railway vehicles.

It is, therefore, an important object of this invention to provide an improved transitional coupling device adapted to facilitate the coupling of railway vehicles equipped with automatic couplers to other vehicles equipped with non-automatic couplers.

Another object of the invention is to provide a chain type connector adapted to be carried by an automatic coupler for detachable connection to a non-automatic or hook type coupler when necessary.

Another object of the invention is the provision of a transitional coupling arrangement wherein the force of gravity is utilized to retain the device in a slack take-up position.

A more specific object of the invention is the provision of a coupling chain connected to one coupler and having at least one link with an eye presenting spaced surfaces selectively engageable with another coupler to take up slack in the chain.

These and other objects of the invention will be apparent from an examination of the following description and drawings, wherein:

Figure 1 is a fragmentary top plan view illustrating portions of a coupling arrangement in which an automatic coupler and a non-automatic coupler are interconnected by a coupling device embodying features of the invention;

Figure 2 is a side elevational view of a portion of the structure illustrated in Figure 1 with the end link of the coupling chain shown in coupling slack take-up position;

Figure 3 is a view similar to Figure 2 (with portions of the structure removed), but with the end link shown in the alternate coupling position or the non-slack take-up position, and Figure 4 is a view similar to Figure 3, but with the end link shown in the released or non-coupling position.

It will be understood that certain elements have been intentionally eliminated from certain views where they are better illustrated in other views.

Now to describe the invention, referring first to Figure 1 of the drawings, it will be seen that an automatic coupler, indicated generally at 10, of one railway vehicle (not shown) is connected to a non-automatic or hook type coupler, indicated generally at 12, of another railway vehicle (not shown) by means of a readily detachable chain, indicated generally at 14.

Automatic coupler 10 comprises a shank 16 and an integrally formed head 18 having a pivotal knuckle 20 and a rigid guard arm 22 disposed adjacent opposite sides thereof to define therebetween a cavity 24 for receiving a knuckle of a mating automatic coupler.

The head is provided with a pair of preferably integral bollards 26 extending horizontally outwardly from opposite sides thereof in a transverse direction relative to the longitudinal vertical center plane of the coupler. Each bollard preferably comprises a trunnion 28 having a vertically disposed retaining lug or plate 30 formed at the outboard end thereof.

Non-automatic coupler 12 comprises a shank 32 having extending forwardly therefrom an integral hook 34 defining a connecting chain receiving opening or slot 36.

The couplers are interconnected by the chain 14, which comprises a somewhat triangularly shaped center link 38 connected to a pair of end links 40 by a pair of intermediate double eye links 42.

Center link 38 defines an aperture or eye 44, Figure 1, adapted to receive and engage hook 34 during the coupling operation. At its rearward extremity, eye 44 presents a generally radially disposed surface or seat 46 which is concave, as seen in plan view in Figure 1, adapted for engagement with a generally convex complementary curved surface 48 presented on the inner side of hook 34 to keep the center link from sliding out of normal coupling position. As seen in plan view, center link 38 is somewhat triangular, having a generally arcuate rear portion 50 which accommodates limited sliding radial movement of the related intermediate links 42 thereon to facilitate equalization of the pressures exerted on the opposite ends of chain 14. To prevent the center link from shifting out of normal position relative to the hook and the intermediate links, portion 50 may be provided with an enlarged section or boss 51 disposed centrally of the section between links 42.

Each end link 40 comprises an irregularly though somewhat oblong shaped body 52 defining a main eye or bollard receiving opening 54. Forwardly of opening 54, each end link presents an eye 56 adapted to receive the related intermediate link 42. The eye 56 may be formed by providing the body with an integral arm 58 which may be heated, bent, passed through a related eye of an intermediate link 42, and then rigidly secured to link body 52 by weld 60. At its rearward end, the link body may be provided with an integrally formed loop or handle 62 to facilitate manual positioning of the link on its related coupling bollard as hereinafter described.

As best seen in Figure 2, the main eye or bollard receiving opening 54 of each end link 40 is somewhat L-shaped comprising one portion 64 extending generally parallel to the longitudinal axis of the link and another portion 66 extending in a direction generally normal to the axis of portion 64 and which is somewhat shorter in length. At opposite sides of opening 54 where the portions 64 and 66 merge or communicate with each other, the inside and outside corners are rounded. At their rearward extremities, the sections 64 and 66 present forwardly facing arcuate surfaces or seats 68 and 70, respectively, the surface 70 being provided adjacent its lower extremity with a raised portion or forwardly extending retainer lip 72, the purpose of which is hereinafter described.

It will be apparent from an examination of Figure 4 of the drawings that the longer portion 66 of end link opening 54 is greater in size than lug 30 in order to permit the attachment of the end link to the related automatic coupler merely by placing the link in a vertical position and raising it a sufficient distance to permit surface 68 of opening 64 to clear the top of plate 30, pushing the link in toward the coupler head, and dropping the link onto trunnion 28. Once the chain has been connected to the automatic coupler in the previously described manner with the link surfaces 68 supported on the related trunnions, it will be seen that, inasmuch as surface 68 of each link is disposed well above the center of gravity of the link when the link is in the vertical position, the force of gravity will normally maintain the link on the bollard. As it is contemplated that the chain will always be carried by the automatic coupler, if desired, in order to preclude the possibility of the accidental removal of the link from the bollard or the theft of the entire chain from the coupler, additional plates or brackets (not shown) may be welded across each end link between the top of each plate 30 and the adjacent side of the coupler head. When the chain is not in use, such as when the automatic coupler is connected to another automatic coupler or not coupled to any other coupler, the chain is free to hang in a vertical position free of all other portions of the coupling apparatus so as not to interfere with normal automatic coupling operations.

To connect the automatic coupler to a non-automatic coupler of an adjacent railway vehicle, center link 44 is lifted and placed over the hook of the non-automatic coupler. At this point, end link is moved from the non-coupling position illustrated in Figure 4 to the slack release coupling position illustrated in Figure 3. After this has been done, in order to take up excess slack in the chain, the handles of either or both end links are grasped and pulled in a rearward direction away from the non-automatic coupler. As each end link moves rearwardly, it passes over the related trunnion 28 and as the trunnion reaches portion 66 of opening 54, the force of gravity causes the link to drop into the slack take-up coupling position illustrated in Figure 2. Because surface 70 of each end link is disposed above the center of gravity of the link when the link is disposed in slack take-up coupling position, the force of gravity will serve to retain the link in the slack take-up position. Also the retainer lip 72 of each link serves to maintain it in slack take-up position.

To release from slack take-up position, in order to obtain slack for unhooking the center link from the hook of a non-automatic coupler, an end link is pulled rearwardly or away from the non-automatic coupler a slight distance sufficient to permit the related bollard trunnion to clear retainer lip 72 of the link, the link is lifted to position the trunnion in the longer portion 64 of the link aperture, and then the link is pushed forwardly toward the non-automatic coupler.

The chain may be made of bar size large enough to afford the strength necessary to permit the entire load to be carried by the chain at such times as necessary, as when the cars to be coupled are on a curved track. In this case, the center link is placed over the hook and the cars are moved to straight track where the end links can be moved to slack take-up position in the manner previously described.

Also it will be understood that one of the end links can be left in slack take-up position most of the time, except when coupling on curved track, for the distance between the forward and rearward seats 68 and 70 on the other end link is normally great enough to permit hooking of the center link onto a hook coupler with the one end link still in slack take-up position.

I claim:

In a transitional coupling device for interconnecting a non-automatic coupler having a hook and an automatic coupler having a head with a pair of lugs projecting outwardly from opposite sides thereof, a chain comprising: a center link for connection to the hook of the non-automatic coupler; and a pair of end links for connection to the lugs of the automatic coupler, at least one of said end links having an eye for receipt of one of the lugs of said automatic coupler and presenting within said eye a pair of surfaces spaced from each other for selective engagement with said one lug to accommodate a take-up of the slack in the connection between the couplers.

References Cited in the file of this patent

UNITED STATES PATENTS

| | | |
|---|---|---|
| 1,511,552 | Whitridge | Oct. 14, 1924 |
| 1,529,980 | Willison | Mar. 17, 1925 |
| 1,807,243 | Kayler | May 26, 1931 |
| 2,682,340 | Kayler | June 29, 1954 |